J. M. HOLLOWAY.
PEANUT STRIPPER.
APPLICATION FILED OCT. 26, 1911.
1,065,249.
Patented June 17, 1913.
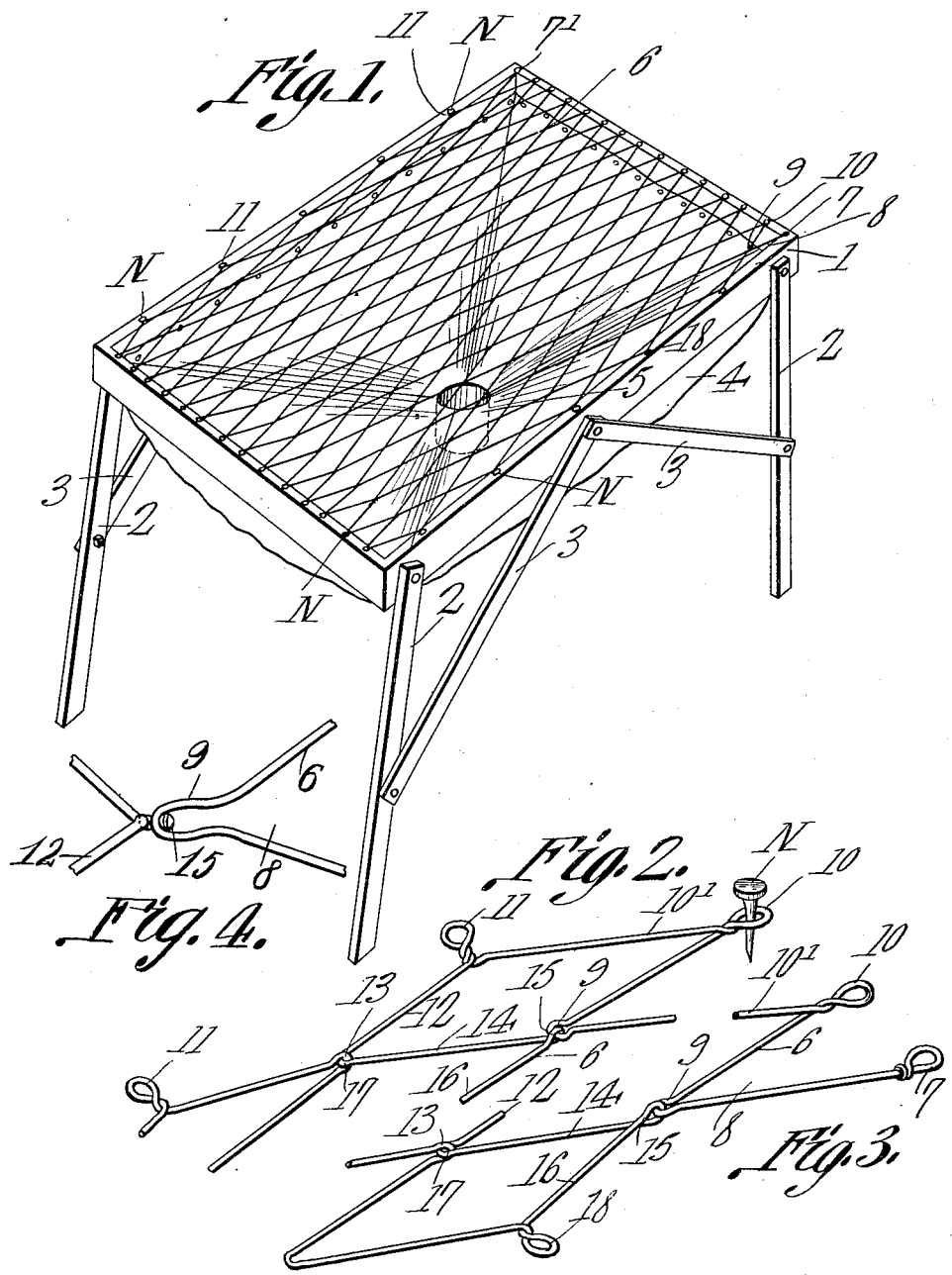

UNITED STATES PATENT OFFICE.

JOHN MILLARD HOLLOWAY, OF GRAYMONT, GEORGIA.

PEANUT-STRIPPER.

1,065,249.  Specification of Letters Patent.  Patented June 17, 1913.

Application filed October 26, 1911. Serial No. 656,872.

*To all whom it may concern:*

Be it known that I, JOHN M. HOLLOWAY, a citizen of the United States, residing at Graymont, in the county of Emanuel and State of Georgia, have invented a new and useful Peanut-Stripper, of which the following is a specification.

The present invention relates to improvements in peanut strippers for stripping peanuts from the vines as the vines are first pulled from the ground, and before the nuts and vines are dried, and the primary object of the invention is the provision of a simple and effective device capable of being readily lifted by one or two persons for moving from one pile to another in the field, and provided with a peculiarly constructed stripping screen or netting disposed upon or above an open frame which is provided with a flexible peanut catching and discharging hopper.

A further object of the present invention is the provision of a stripping screen or netting composed of wire and so constructed as to provide a plurality of longitudinally disposed diamond-shaped meshes which provide means for permitting the protrusion of the peanuts when rotated and pulled over the said netting whereby the converging ends of the said openings formed in the netting will engage and hold the nuts therebelow so that the roots will be severed or broken therefrom and the nuts will fall by gravity into the hopper where they are delivered to the proper receptacle.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings Figure 1 is a top perspective view of the complete peanut stripper. Fig. 2 is a detail view of a portion of the netting. Fig. 3 is a similar view showing the construction of the netting at the beginning of the strand of wire. Fig. 4 is a plan view of a portion of the fabric.

Referring to the drawings, the numeral 1 designates a rectangular open frame provided with a plurality of legs or supports 2, held relatively to each other by means of the inclined braces 3.

Connected to the inside of the frame, or the lower edge thereof, is a flexible hopper 4 provided with the centrally disposed spout 5 which is circular in cross section, the said hopper being disposed to receive the stripped peanuts and by reason of the shape thereof deliver by gravity the said peanuts through the spout 5 to the desired receptacle placed below the stripper frame.

Connected to the upper face of the frame 1 by means of nails or other fastening means N, and held taut thereover is a stripping netting or lattice work 6 of wire, the detail construction of which is clearly shown in Figs. 2 and 3.

The fabric or netting utilized as a stripping medium is preferably formed of a single strand of wire. One terminal of this strand is bent and twisted to form an eye 7 and the strand is bent to zig-zag form, the outer angles 10' thus formed being merged into loops which are twisted to form eyes 10. The inner angles formed, and which have been indicated at 8, merge into elongated loops which lie in the general plane occupied by the zig-zag portions of the strand. One end of the zig-zag strand merges into an eye 11 and from this eye the strand is extended zig-zag, as shown at 12, one series of angles thus produced merging into substantially vertical eyes or loops 15 which engage the loops 9. The other set of angles thus produced are merged into elongated loops or necks 17 similar to the loops or necks 9 hereinbefore described. That end of the zig-zag portion 12 remote from the eye 11 is twisted to form an eye 18 and from this eye extends another zig-zag portion similar to the zig-zag portion 12. Thus it will be seen that the fabric is made up of any desired number of courses of zig-zag portions having interfitting loops or necks 9 and eyes or loops 15. The eyes 10 and 7 formed along opposed sides of the fabric and the eyes 11 and 18 formed at the ends of the fabric are designed to receive nails or other fastening devices N such as hereinbefore referred to.

It will be apparent that when vines are drawn over the fabric, the roots or shells will gravitate through the diamond meshes produced by the zig-zag portions and the stems will be drawn into the elongated loops or necks 9 and 17, these necks being of such width as to prevent the shells from pulling through them. Thus, continued pull upon the vines will result in the shells or roots being stripped off of the vines and, as the stems fit loosely in the necks 9 and 17 it will be apparent that as soon as they are stripped from the vines, the shells will drop away from the fabric and into the hopper 4 from which they will gravitate through the spout 5. Heretofore it has been customary to employ an ordinary diamond mesh fabric for stripping peanuts from vines but such fabric has been found objectionable because it has pinched the stems in stripping the nuts from the vines and it has been difficult to dislodge the stems of the stripped nuts from the fabric. Furthermore where diamond meshes are used, only one stem will be gripped at a time whereas, where elongated necks or loops are used, as in the present device, two or more stems can enter each loop or neck so that when the vine is pulled, two or more shells or nuts will be stripped simultaneously.

What is claimed is:

1. A peanut stripper embodying a single length of wire bent to form a plurality of diamond meshes, each mesh being provided, at one end, with an open neck for receiving peanut stems.

2. A peanut stripper embodying a single length of wire bent to form a wire fabric having a plurality of diamond meshes, each mesh being provided, at one end, with an open neck for receiving peanut stems and at its opposed end with a loop for engaging the neck of the adjoining mesh.

3. A peanut stripper including a wire fabric having a diamond mesh, each mesh being provided, at one end, with an open substantially horizontal neck for receiving peanut stems, and at its opposed end, with a substantially vertical loop for engaging the neck of the adjoining mesh.

4. A peanut stripper including a fabric made in a single length of wire bent to form a plurality of diamond meshes, each mesh being provided at one end with an open neck for receiving peanut stems, and at its opposed end with a loop for engaging the neck of the adjoining mesh, and fastener receiving eyes integral with the marginal meshes of the fabric.

In testimony that I claim the foregoing as my own, I have hereto affixed my signature in the presence of two witnesses.

JOHN MILLARD HOLLOWAY.

Witnesses:
G. L. WILLIAMS,
C. C. FAIN.

Copies of this patent may be obtained for five cents each, by addressing the "Commissioner of Patents, Washington, D. C."